Patented Jan. 9, 1940

2,186,661

UNITED STATES PATENT OFFICE 2,186,661

CLAY AND METHOD OF MIXING IT WITH WATER

Paul Bechtner and Winfred B. Hirschmann, Chicago, Ill., assignors, by mesne assignments, to American Colloid Co., Chicago, Ill., a corporation of South Dakota No Drawing. Application December 7, 1936, Serial No. 114,712

4 Claims. (Cl. 252—6)

The present invention relates to improvements of clays and methods of mixing them with water. It has for an object the making of smoother mixtures of clay in water by simple and more rapid methods than previously employed.

Another object is to incorporate the clays readily with water without hindering the desirable gelatinizing and swelling properties.

A third object is to prepare the mixtures substantially free from clots or lumps of unsaturated solids.

Another object is to form dispersions, slurries, or gels of higher concentrations than are possible by the present methods.

An additional object is to make such mixtures of clay and water by continuous as distinguished from batch processes.

A still further object is to provide a clay which is adapted for use in this continuous mixing process.

A further object is to permit utilization of the finely divided fractions of a pulverized clay in forming suspensions.

The present invention represents an improvement over the clay and the processes disclosed in our U. S. Patent No. 2,036,617. In this patent, a process was disclosed whereby difficultly slakable clays such as bentonitic clay, could be rendered readily slakable by limiting the particle size between an upper and a lower limit. This had the effect of removing the large particles into which water penetrated very slowly and also removed the fines or powdered fractions which tended to float or form into agglomerates which resisted wetting.

We have further discovered that by suitable handling of the pulverized clays we can disperse them just as readily as the selectively sized ones and we have also discovered that there are certain degrees of pulverization which are more easily mixable by such handling than others. Of course it will be understood that a clay which has to be carefully sized to both an upper and a lower limit is more expensive both as to grinding and as to screening than a clay which can be merely ground and perhaps screened once.

Our invention embraces specifically clays that are difficult to slake or disperse, or mix smoothly in water. Such clays are extensively used in industrial processes in the form of a soft mud, paste, or slip, as in ceramic processes, in the mud-laden-fluid method of drilling oil and gas wells, in the paper industry, in some phases of foundry work, in making emulsions of asphalt or other water immiscibles, in horticultural sprays, and in the manufacture of soaps and polishes.

In their common commercial forms such clays are difficult to mix smoothly with water to form the paste or dispersion that is required for these uses. When added to water in lump form, they sink immediately to the bottom of the vessel and resist soaking to a surprising degree. Even after hours or days of standing the lumps frequently have hard and dry centers. On the other hand, when a mass of such clays in a finely powdered form is added to water in a vessel, it will float on the water surface; the particles immediately in contact with the water swell rapidly to close the voids and passages to the interior of the mass, resulting in agglomerates with a sticky water sealing coating and a soft but dry interior. Attempts to stir masses of such powdered clays result in the formation of clots or unsaturated agglomerates which adhere tenaciously to the paddles of the mixing equipment. While these can eventually be broken up, much time and power is required to do so. In addition, the stiffness of the muds formed with these clays is so great, that it is practically impossible to make concentrations greater than 15 to 17% with the usual type of stirring or agitating apparatus.

There are known methods by which such difficultly slakable clays may be incorporated with water fairly readily, but such methods have objectionable features. One of these means, for example, is to use electrolytes either mixed with the clay or dissolved in the water. They are effective but have the disadvantage of altering the properties of the clay to the detriment of its employment for some purposes. Another method is to pre-heat the clay to temperatures at which some of its chemically-combined water is driven off, but in doing so, some of its useful properties are inhibited in proportion to the degree of heat which has been applied. Another method is to make a paste of the pulverized clay with alcohol, acetone or other water soluble fluid and then mix with water. This is obviously expensive. A further means is to blend the dried clay with some inert material such as whiting or powdered silica, etc., which help keep the particles from agglomerating and permit the water to enter them more readily. This however, changes the character of the product. Furthermore, most of these methods have the disadvantage of being batch instead of continuous processes.

In carrying out this invention we prepare masses or aggregates of ground clays in such form that they can be readily wetted, and then contact such masses or aggregates with water in a special manner. To illustrate, by suitable means we spread out a stream of water into a thin sheet and have a similar sheet of clay flow onto it. The thickness of the clay sheet is such that the water can penetrate through it before the particles on the surface touching the water can swell to form a gelatinous layer which would seal off further penetration. This is an improvement which extends the principle of our patent above referred to which discloses the dispersion of the selectively sized grains, which are prepared not only so that they are self-immersible but also of such diameter that the water can penetrate to their cores before the surface particles swell to form a gelatinous sealing layer. In this case of the pulverized materials in sheet form, it is not an individual particle that is prepared of such diameter, but a group of finer particles which are aggregated in layers of such thickness. It follows, therefore, that the individual particles in the layer must not exceed the upper size limit of the critical slaking range for the particular clay.

As a concrete illustration of a method of carrying out this novel invention, we give the following description:

Water is spread out into the form of a sheet by forcing it under pressure through a slot or other common means, and clay is sprinkled onto that sheet in thin layered form. That is, water coming from a pipe may be spread out in the form of a ribbon instead of flowing out in the shape of a cylinder as is customary. The clay may also be spread out in the form of a ribbon. Incorporation of these two flat streams will make a simple mixture readily. The water may be continuously fresh without any clay mixed in with it, or it may be re-circulated from a tank so that the concentration is gradually built up or it may be a natural or artificial watery fluid containing finely divided solids or other substantially non-ionizing materials.

The ground clay may be put in ribbon form in several ways. One employs a vibrating feeder. This apparatus consists of a hopper with a trough underneath it that is vibrated by means of an electro-magnetic oscillator. It is well known that pulverized clays, such as the common commercial form of about 90% through a 200 mesh sieve, do not flow out of hoppers uniformly and spontaneously. Some external assistance is usually required; the vibrator is one means of supplying it. It causes the material to flow from the hopper over the trough, and by adjusting the amplitude of vibration, the rate of flow of the clay can be regulated. With the trough in the shape of a broad fan, the clay coming from the bottom of the hopper can be spread out into a thin layer. If it falls onto a broad, thin, fan-shaped stream of water directly beneath, it will soak up at once to make a dispersion. The trough can be flat, convex, or take any of numerous obvious forms, with the water stream preferably having the same general shape and dimensions. Furthermore, instead of having the clay fed from the hopper over a trough, we can have it fall out of a hole in the bottom of a funnel-shaped hopper onto the apex of a vertical cone centered beneath the hole to which a vibrator is also attached. By the time the clay reaches the circumference of the base of the cone it is spread out in a very thin layer so that when it falls onto a surrounded or enclosed cone-shaped sheet or spray of water, it soaks up immediately to form a practically lumpless slurry.

It is not always necessary to use external assistance such as a vibrator to get uniform flowing. We have found that clays somewhat less finely ground run spontaneously out of small openings. For example, clay from Belle Fourche, South Dakota, with the following sieve analysis will flow freely out of slot $\frac{1}{16}$" wide or a hole $\frac{5}{32}$" in diameter:

|  | | Per cent |
|---|---|---|
| $-40+50$ | mesh | 9 |
| $-50+60$ | do | 19 |
| $-60+80$ | do | 13 |
| $-80+100$ | do | 10 |
| $-100+140$ | do | 16 |
| $-140+200$ | do | 13 |
| $-200$ | do | 20 |

It is to be noted that this anaylsis shows quite a proportion of particles to be finer than 200 mesh. Such fine grains do not hinder the uniformity of flow through the narrow openings unless the amount of them present is too large. In such cases it is necessary to remove them entirely or to remove enough of them to get a mass of particles that flows freely. This elimination of dust will result in grades of size ranges such as for example $-50$ mesh $+200$ mesh or $-100$ mesh $+200$ mesh. There is really no limit to the fineness of the particles that can be present. Their proportion is what counts and so long as the clay flows freely through narrow slots to form smooth water mixtures, it is satisfactory for the purpose of this invention.

The maximum size of particles as well as the thickness of the clay masses or layers is limited by the rate of swelling of the clay. Those clays which form impervious surface layers fast are restricted to relatively small particles and layer thicknesses, while those which swell more slowly can have larger ones present. In general, we have found that clay masses consisting largely of particles greater than 0.02 inch wet too slowly to be useful, and are consequently beyond the scope of this invention.

By the use of such readily flowing materials we can make mixtures of water and difficultly slakable clays quickly, easily, and with very simple equipment, and consequently the size ranges of easily dispersible materials covered in our U. S. Patent No. 2,036,617 are extended. Such spontaneously flowing materials also facilitate greatly in making up other mixtures such as dry blends.

We have found that a spray gun is another means of preparing the clay in easily wetted form and making water mixtures. A stream of dust can be blown against an atomized jet of moisture coming out of a spray nozzle to form a suspension or paste, depending on the relative proportions of the materials. The method is subject to considerable flexibility, and requires as a whole but one precaution: the angle at which the streams intersect should be quite small. If they meet each other at right angles, the force and speed of the air carries some of the powder through the spray without being wetted. If, however, the two jets are aimed in the same direction so that they flow almost parallel to each other, they blend and much more complete mixing results.

One method of using the spray gun type of apparatus consists in having both jets in the form of thin, broad fans. When these are paralleled and brought together with a small angle between them, much more thorough mixing results because it is spread over a much larger space.

Instead of a thick stream of solids meeting a thick stream of liquids, individual particles of dust meet individual droplets of fluid. Naturally there is much less chance for particles to escape being wetted and much less chance for agglomerates to form. With a fan-shaped jet of dust enclosed between two fan-shaped jets of liquid, the blending is still better.

There are many variations of the above use of a spray apparatus for bringing the clay and water together. For example, they can be blown out of concentric openings with the powder on the inside so that it is imprisoned and cannot escape being wetted, particularly if the two jets are almost parallel. Also, the jets can be given twisting or twirling motions or be varied from circular or very wide, broad fans to practically any other form desired. In addition, the air for blowing the clay into contact with the water can be replaced by steam which will naturally condense on contact with the water and therefore prevent the occurrence of disturbing currents of air which tend to carry out of the receiving vessel some of the spray of the paste or suspension formed. It may also be desired to have the water in the vapor state to form products which are only slightly wetted.

To illustrate the ease with which dispersions of difficultly slakable clays can be formed with our invention, we cite the following examples:

*Example 1.*—Pulverized gel-forming bentonite was caused to flow over a rectangular trough of a vibrating feeder. It dropped off the end of the trough in a thin layer onto a sheet of water. In 2½ minutes, 100 pounds of a smooth 5% mixture was formed.

*Example 2.*—A mixture of the same clay was also made with water by means of a modification of the ordinary paint spraying apparatus. The powdered clay was put into a container and by means of a jet of air, blown out of an opening directed at a fine spray of water. A uniform mud of 30% concentration resulted at once.

*Example 3.*—A typical gel-forming clay from the Black Hills region was ground to the following sieve analysis:

| | | Percent |
|---|---|---|
| −40+50 | mesh | 9 |
| −50+60 | do | 19 |
| −60+80 | do | 13 |
| −80+100 | do | 10 |
| −100+140 | do | 16 |
| −140+200 | do | 13 |
| −200 | do | 20 |

It was then put into a container with a slot in the bottom whose dimensions were $\frac{3}{16}$'' by 36'', and which could be opened or closed by a slide at will. The hopper bottom shape permitted all the clay to run out. Directly underneath the slot and paralleling the direction of flow of the clay was fastened a device out of which water would flow in a sheet also 36'' wide. The water was turned on and its flow adjusted to the rate of 160 pounds per minute and the slide opened so that the clay would flow out at the rate of 40 pounds per minute. In 20 minutes 4000 pounds of a smooth mud of 20% concentration was formed.

*Example 4.*—For comparison with the above rapid and economical method, a slightly smaller quantity of the same bentonite pulverized so that 90% passes through a 200 mesh sieve, was made into a paste by means of ordinary mixing machinery using a tank type mixer having a heavy agitator with alternating blades revolving in opposite directions. The water was put into the tank first and the clay added at the best rate to permit the machinery to operate smoothly under the direction of a man experienced in clay mixing. The results indicated a requirement of 5 horsepower and 2 hours of mixing to produce 4,000 pounds of a paste containing 17% of the clay.

All these means are applications of our fundamental invention of separating the particles of ground clay into masses or aggregates of such thickness that they can be readily wetted, and contacting them with water. They not only permit the same materials and the same quantities of them to be brought together as is possible in present processes, but also allow a wider range of proportions to be employed. They have the desirable features of being continuous and simple. Furthermore, if the product is to be used as a coating compound, it can be sprayed on the surface to be covered without the necessity of collecting it in a container and then applying it with a brush. The materials can therefore be incorporated and/or used with the saving of time and expense.

With regard to all of the above methods of mixing the pulverized clay with water it is to be noted that in case a layer is formed this layer must be of such thickness that water can penetrate the layer thoroughly before the surface particles swell and seal the layer against further penetration of water. If aggregates of fine particles are formed such as by air spraying, the thickness of the aggregates must likewise be such that the water can completely wet the aggregates before the surface particles swell and close off further water. In the case of the air spray the particles may be regulated by varying the relation between clay and air used. The proper adjustment is obtained when the mixture or dispersion is substantially free from clots or lumps of unsaturated particles. In the case of the flowing layers the flow of clay and the action of the vibrator or other factors employed will be adjusted to have the layer delivered to the water at this required thickness.

As has been pointed out, this invention also contemplates a clay of such particle size that it can be employed in continuously forming these dispersions or mixtures without the use of flow hastening means. Therefore, the clay is prepared so as to flow spontaneously from an opening of such size as to give the desired layer thickness. For this reason the particles are kept below the upper limit described and will also be freed from an excessive quantity of fines which have the effect of preventing spontaneous flowing.

While the specification has referred specifically to making mixtures of clays with water, it is evident that this water does not necessarily have to be pure or free from other substances. It may contain inert solids such as sand, barytes, iron oxide, etc., as occur in drilling muds or other manufactured fluids, or it may be a natural mixture such as rubber latex. The applicability of these water mixtures or solutions to this invention is restricted only by the ions or other materials that they contain, which should not be of such character or concentration as to hinder significantly the swelling or self-suspendability or gelatinizability or other colloidal properties of the clay. The term "water" as used in the specifications and claims, therefore refers not only to the pure liquid but also to such mixtures and/or solutions.

The invention is also adapted to making mixtures of clays with dry materials such as sands or powders or other compositions. Besides the continuous and automatic qualities, these materials and methods promote quick and uniform blending because of being spread out into thin layers.

It is obvious that various changes and modifications may be made in the details of construction and design of the above specifically described embodiment of this invention without departing from the spirit thereof, such changes and modifications being restricted only by the scope of the following claims.

What is claimed is:

1. A mass of particles of bentonitic clay prepared so that they are all less than the critical slaking size with only enough of the finest particles removed to permit the mass to flow spontaneously through a slot 1/16" wide whereby when allowed to run out of such slot onto a running sheet of water it will mix therewith to produce a mud or slip.

2. The continuous method of dispersing a difficultly slakable clay below the critical slaking size range in water which comprises producing a running stream of clay with its particles less than 0.02" in diameter and of a size to flow spontaneously out of a slot 1/16" wide, spreading the clay into a thin layer of such thickness that water can penetrate and thoroughly wet the clay stream before its surface swells and seals off the water, producing a similar thin layer of water, and bringing the stream of clay into contact with the stream of water with both streams flowing in substantially the same general direction.

3. The process of preparing dispersions, emulsions, gels, pastes or slips continuously from bentonitic clay which comprises preparing the clay so that its particles are less than 0.02" in diameter and of a size to flow spontaneously out of a slot 1/16" wide, spreading the clay into a thin layer and contacting the layer of clay with a similar layer of water flowing in the same general direction as the layer of clay.

4. The method of preparing mixtures of bentonitic clay and water which consists in spreading clay of particles below the upper limit of the critical slaking size range into a layer of a thickness such that water can penetrate therethrough before the outer surface of the layer swells to exclude further water, and bringing the layer of clay into contact with a similar layer of water.

PAUL BECHTNER.
WINFRED B. HIRSCHMANN.